(12) United States Patent
Jordanov

(10) Patent No.: US 6,369,393 B1
(45) Date of Patent: Apr. 9, 2002

(54) DIGITAL PULSE DE-RANDOMIZATION FOR RADIATION SPECTROSCOPY

(75) Inventor: Valentin Jordanov, Durham, NH (US)

(73) Assignee: Canberra Industries, Inc., Meriden, CT (US)

(*) Notice: Subject to any disclaimer, the term of this patent is extended or adjusted under 35 U.S.C. 154(b) by 0 days.

(21) Appl. No.: 09/530,532
(22) PCT Filed: May 7, 1999
(86) PCT No.: PCT/US99/10010
  § 371 Date: Oct. 2, 2000
  § 102(e) Date: Oct. 2, 2000
(87) PCT Pub. No.: WO99/58999
  PCT Pub. Date: Nov. 18, 1999

Related U.S. Application Data

(60) Provisional application No. 60/084,891, filed on May 9, 1998.

(51) Int. Cl.$^7$ .................................................. G01T 1/17
(52) U.S. Cl. ...................... 250/395; 250/369; 250/262; 250/370.06
(58) Field of Search ............................... 250/395, 369, 250/262, 370.06, 375, 252.1; 702/190, 66, 70, 79

(56) References Cited

U.S. PATENT DOCUMENTS

| | | | |
|---|---|---|---|
| 3,991,611 A | * 11/1976 | Marshall, III et al. | ... 340/855.5 |
| 4,061,919 A | * 12/1977 | Miller et al. | ............ 250/363.02 |
| 5,132,540 A | * 7/1992 | Adolph et al. | ............... 250/369 |
| 5,349,193 A | * 9/1994 | Mott et al. | ............. 250/370.06 |
| 5,430,406 A | * 7/1995 | Kolodziejczyk | ............. 327/346 |
| 5,493,120 A | * 2/1996 | Geagan | ...................... 250/363 |
| 5,532,944 A | * 7/1996 | Battista | ...................... 364/602 |
| 5,884,234 A | * 3/1999 | Jorion et al. | .................. 702/66 |

* cited by examiner

*Primary Examiner*—Constantine Hannaher
*Assistant Examiner*—Albert Gagliardi
(74) *Attorney, Agent, or Firm*—John H. Crozier

(57) ABSTRACT

In a preferred embodiment, a method of digitally de-randomizing pulses in a radiation spectroscopy system, the method including the steps of: receiving an input signal representative of a radiation detector output; analyzing the input signal to derive separate event samples and background samples; storing the event samples and the background samples; and reading stored event samples and background samples and adjusting spacing in time between adjacent event samples such that the event samples are spaced apart a time interval at least equal to pulse processing time of elements receiving an output of spaced apart event samples and the background samples.

2 Claims, 10 Drawing Sheets

1. Detector
2. Preamplifier
3. Signal Conditioner
4. Sampling ADC
5. Pulse Shaper
6. Pulse-Height Analyzer
7. Pulse Derandomizer Spectroscopy configuration using digital pulse derandomization.

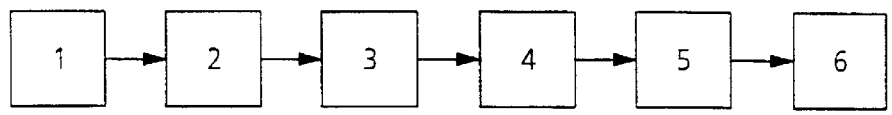

1. Detector
2. Preamplifier
3. Signal Conditioner
4. Sampling ADC
5. Pulse Shaper
6. Pulse-Height Analyzer

FIG. 1 Typical digital spectroscopy configuration.
(PRIOR ART)

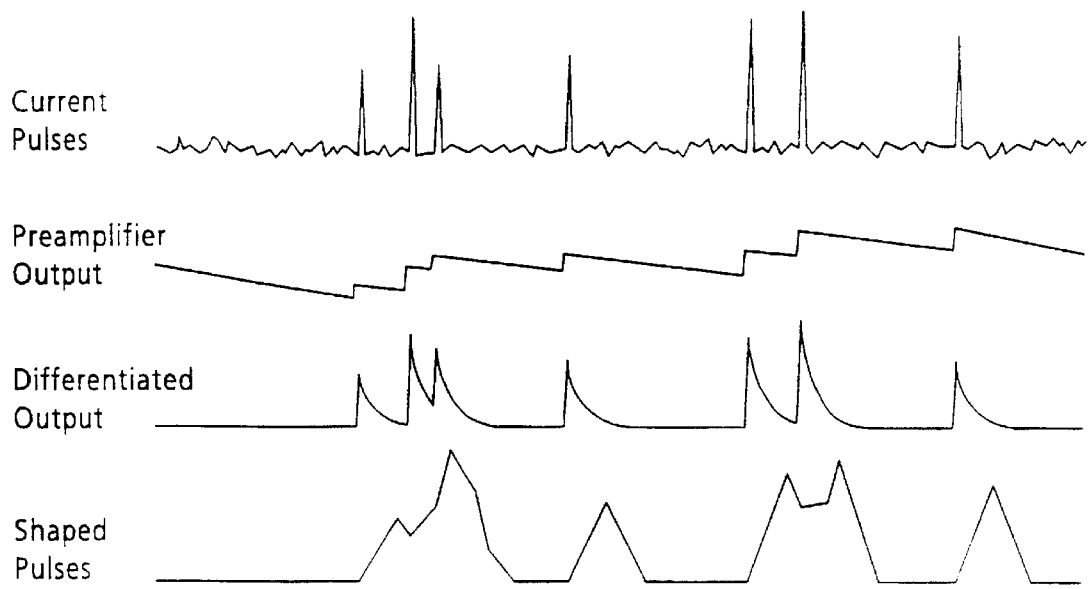

FIG. 2 Pulse shapes at key points of a typical digital spectrometer.
(PRIOR ART)

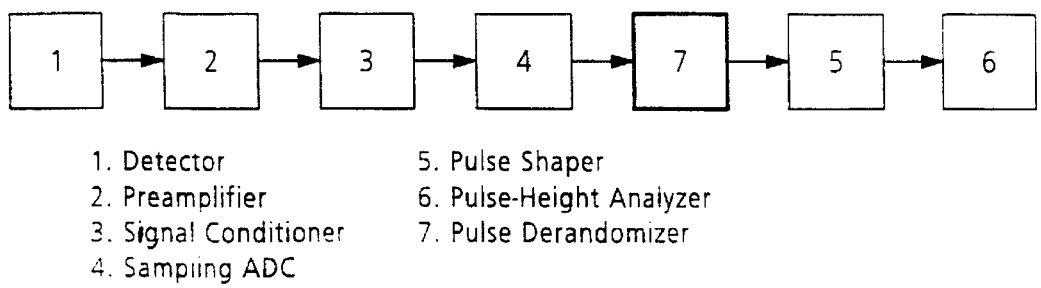

1. Detector
2. Preamplifier
3. Signal Conditioner
4. Sampling ADC
5. Pulse Shaper
6. Pulse-Height Analyzer
7. Pulse Derandomizer

FIG. 3 Spectroscopy configuration using digital pulse derandomization.

Flow diagram of the process that separates and stores event and background samples.

Flow diagram of the pipeline reading process with reading clock operating at the same frequency as the ADC sampling clock.

Flow Diagram of the pipeline reading process using adaptive reading clock.

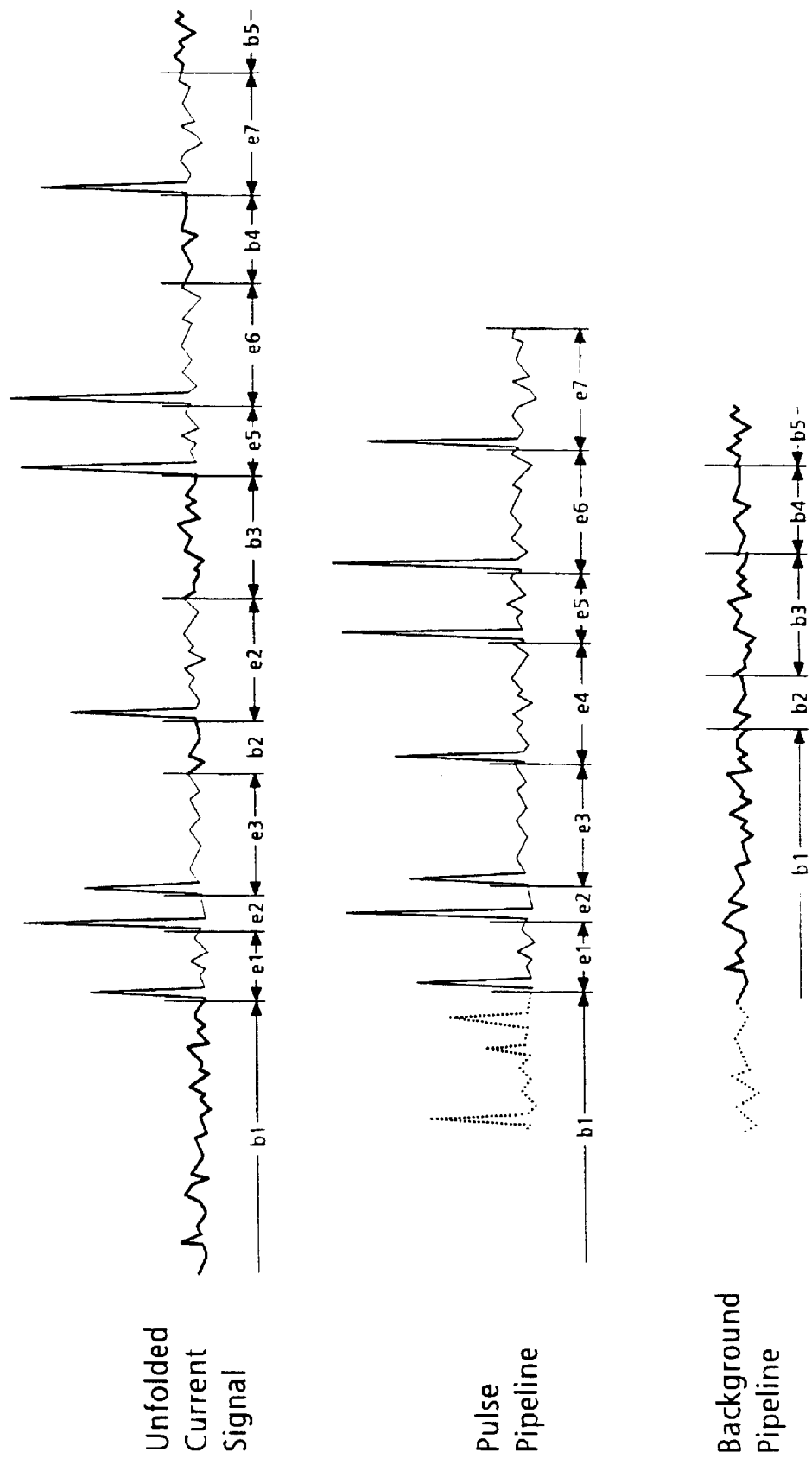
FIG. 7a Signal diagrams illustrating the derandomization process: separation and storage of the event and background samples.

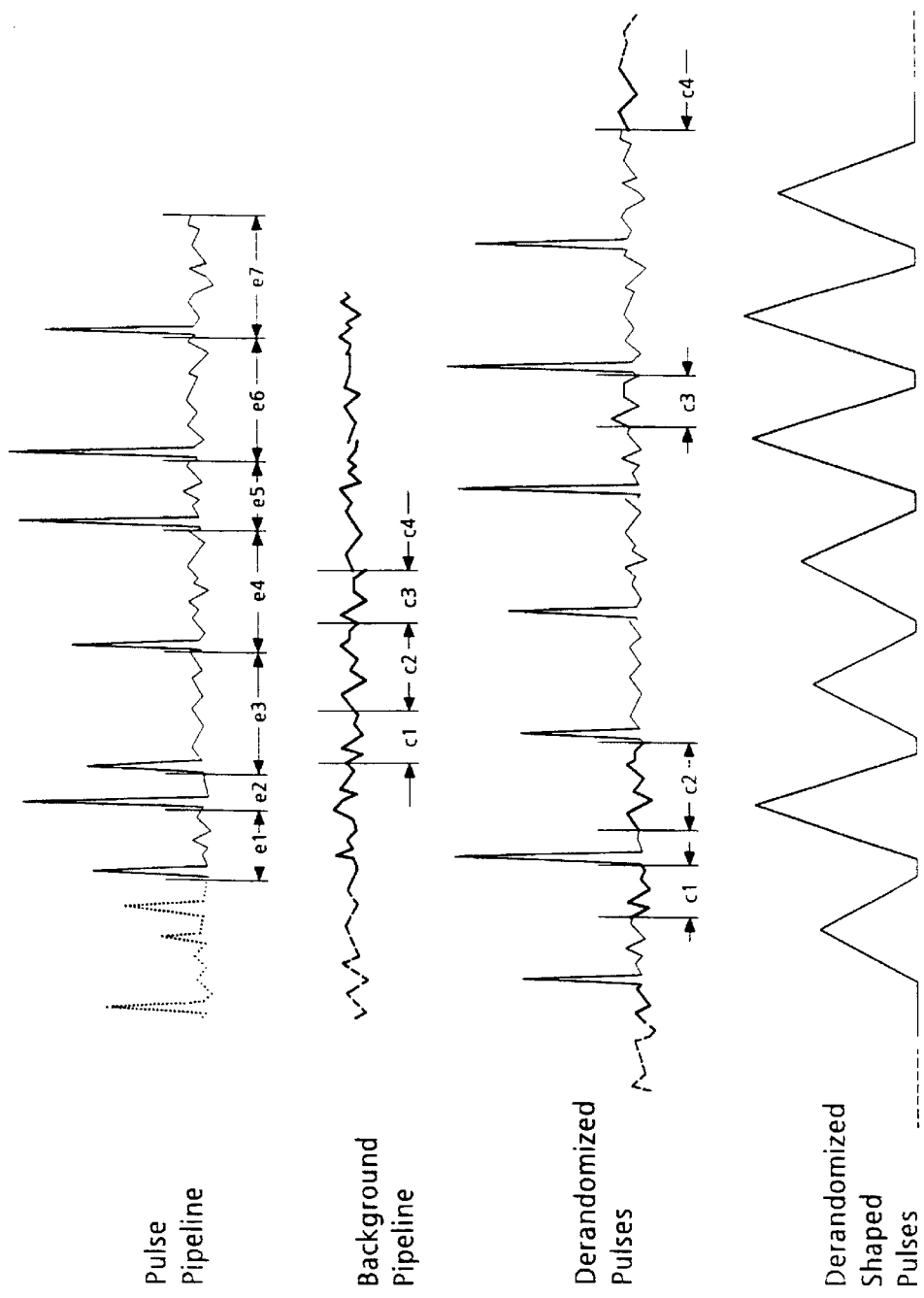
FIG. 7b Signal diagrams illustrating the derandomization process: reading the event and background pipelines and adjusting the spacing between successive events.

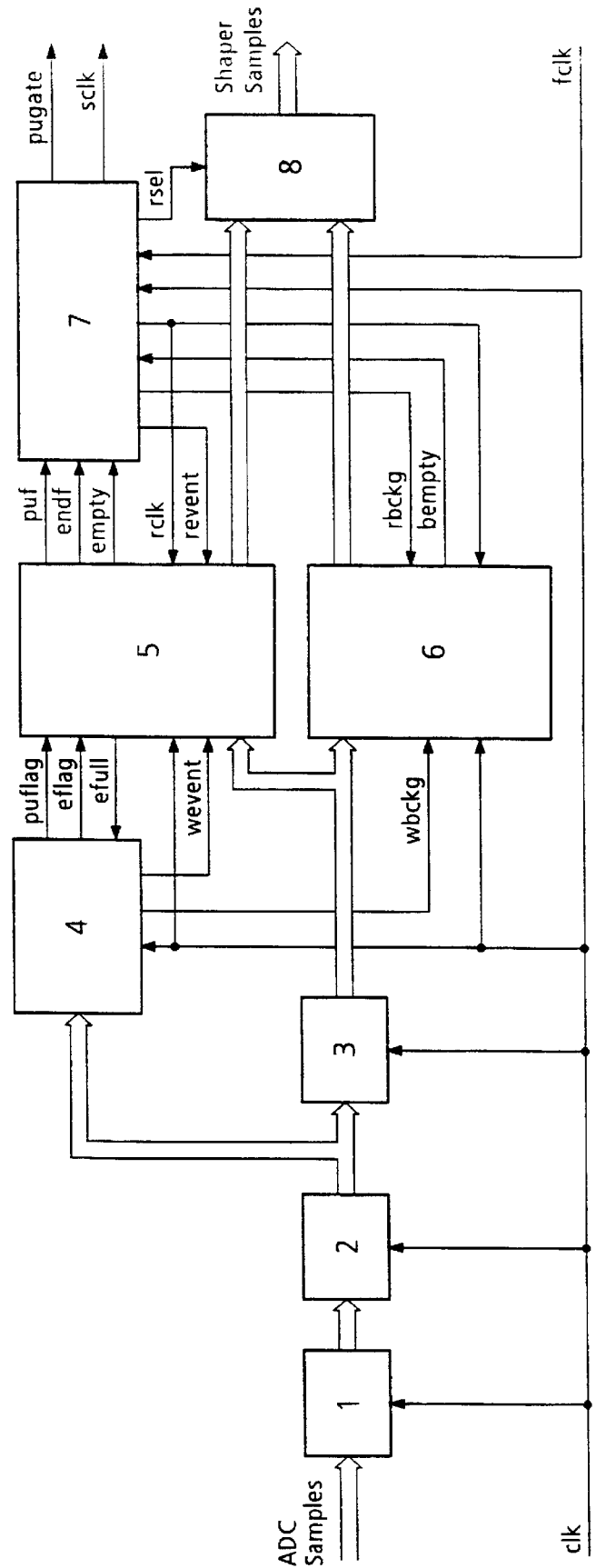
FIG. 8 Block diagram of the digital pulse derandomizer. (1) unfolding unit (deconvolver), (2) fast pre-filter, (3) pre-trigger delay pipeline, (4) event separator, (5) event pipeline, (6) background pipeline, (7) data combine Block diagram of the event separator. (See text for unit description).

Block diagram of the data combine unit (1), (2), (4) and (14) D type flip-flop; (3), (6), (8), (9) and (11) AND gates; (5) R-S trigger; (10) OR gate; (7) down counter with zero decoder; (12) clock gate; (13) clock selector.

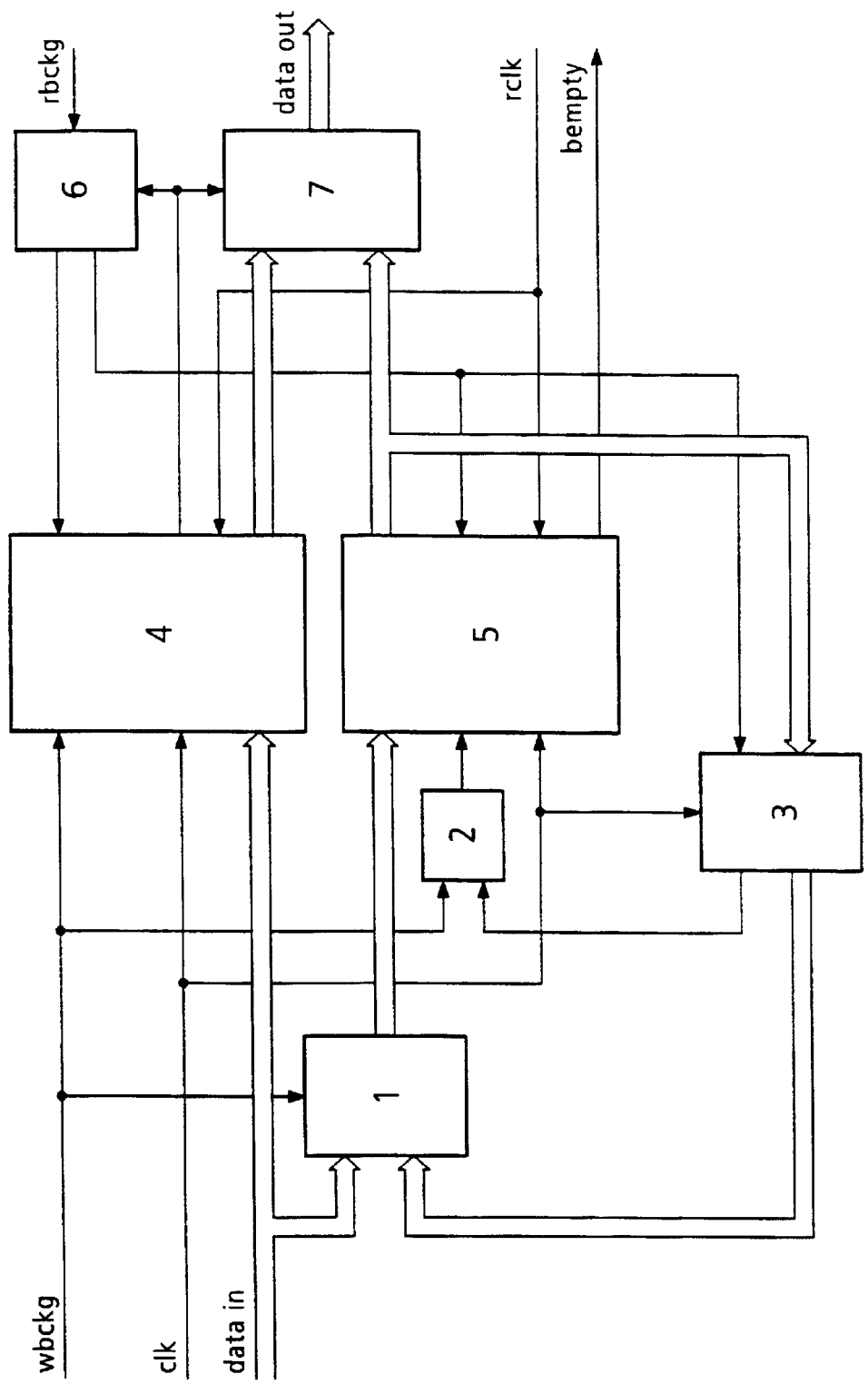
FIG. 11 Block diagram of the background pipeline. (1), (6) and (7) multiplexer; (4) and (5) FIFO pipelines; (2) OR gate; (3) data latch ved in the United States patent document US 6,369,393 B1.

DIGITAL PULSE DE-RANDOMIZATION FOR RADIATION SPECTROSCOPY

This application is a 371 of PCT/US 99/10010, filed May 07,1999, which claims benefit of U.S. application Ser. No. 60/084,891, filed May 9,1998.

TECHNICAL FIELD

The present invention relates to radiation spectroscopy generally and, more particularly, to novel method and apparatus using digital pulse de-randomization of signals produced by a radiation detector.

BACKGROUND ART

Radiation spectroscopy is performed by pulse height analysis of pulses from radiation detectors. The radiation interacts with the detector matter in a very short time. In semiconductor detectors, such interactions result in the creation of charge carriers that move from the point of interaction to the detector electrodes. The signal generation ends when all charges are collected. Therefore, the detector charge signal has a duration equal to the time interval from the moment of charge creation to the moment of full charge collection. If the effects of charge tapping and de-trapping can be neglected, then the duration of the detector current pulse is very short. The charge collection time depends on detector material, detector shape and the detector operating conditions. For most Ge and Si detectors, the charge collection time is in the range from a few nanoseconds up to a few hundreds of nanoseconds.

The current signal of the detector is superimposed on an equivalent background noise that is associated with the detector (leakage current) and the front-end electronics (preamplifier, bias circuit, etc.). It is, therefore, necessary to post-process (shape) the detector signal in order to improve (optimize) the signal to noise ratio. In modern spectroscopy systems, the duration and the form of the shaped pulses determine the pulse-processing time which is the minimum time required for correct estimation of the amplitude of the measured pulse. The duration of the shaped pulses can be 10 to 100 times longer than the response time of the detector. As a result, although the response of the detector is very fast, the pulse height measurement requires longer time due to pulse shaping that improves signal to noise ratio.

The event rate is the rate at which the radiation quanta interact with the detector and produce charge pulses. When radiation from radioactive sources is measured, the time intervals between adjacent events are randomly distributed. The distribution function is an exponential function that depends on the event rate. See Knoll, G. F., *Radiation Detection and Measurement*, $2^{nd}$ ed., John Wiley and Sons, 1989. Therefore, for a given event rate, there is a finite probability that two or more events may occur during the pulse-processing time. This phenomenon is known as pulse pile-up.

The pulse pile-up affects both the pulse-height measurement and the throughput rate (recording rate) of the spectrometers. Ideally, only events that are free of pile-up should be accepted and recorded. For a paralyzable system (e.g. pulse shaper), the pile-up free rate is given by $re^{-2rT}$, were r is the event rate and T is the pulse processing time of the system. For instance, if the event rate is 50,000 events per second (cps) and the pulse processing time is 20 $\mu$sec, the pile-up free rate will be ~6,800 cps. If the events were periodic (equal time intervals between successive events), then for event rates less than $T^{-1}$, the pile-up free rate will be equal to the event rate.

One of the techniques to reduce the pile-up effects is pile-up rejection. See Knoll, supra. Devices, known as pile-up rejecters, are used in order to prevent recording of relatively large fraction of pile-up events. It is obvious that at high counting rates the rejection technique significantly reduces the throughput rate of the spectroscopy system. In order to improve the throughput rate, another technique has been employed—adaptive pulse processing. See Lakatos, T., "Adaptive Digital Signal Processing for X-Ray Spectrometry", *Nucl. Instr. And Meth.*, B47, pp. 307–310, 1990; and "EDS Performance with Digital Pulse Processing", Mott, R. B. and J. J. Friel, in *X-ray Spectrometry in Electron Beam Instruments*, D. Williamns, J. Goldstein, and D. Newbury, eds., Plenum, N.Y., 127–157 (1995). This technique adjusts the pulse-processing time depending on the time interval between adjacent events. Although some improvement in the throughput rate can be achieved, the noise suppression (pulse shape) is not the same for all of the events causing undesirable peak distortion and broadening.

Accordingly, it is a principal object of the present invention to provide method and apparatus for eliminating or reducing pulse pile-up in radiation spectroscopy systems.

It is a further object of the invention to provide such method and apparatus that employ digital techniques.

It is another object of the invention to provide such method and apparatus that achieve de-randomization of the events with an average time interval between adjacent events equal to or longer than the pulse processing time.

It is an additional object of the invention to provide such method and apparatus that improve the throughput rate of systems with fixed pulse processing time.

Other objects of the invention, as well as particular features, elements, and advantages thereof, will be elucidated in, or be apparent from, the following description and the accompanying drawing figures.

DISCLOSURE OF INVENTION

The present invention achieves the above objects, among others, by providing, in a preferred embodiment, a method of digitally de-randomizing pulses in a radiation spectroscopy system, said method comprising the steps of: receiving an input signal representative of a radiation detector output; analyzing said input signal to derive separate event samples and background samples; storing said event samples and said background samples; and reading stored said event samples and said background samples and adjusting spacing in time between adjacent said event samples such that said event samples are spaced apart a time interval at least equal to pulse processing time of elements receiving an output of spaced apart said event samples and said background samples.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, on which:

FIG. 1 is block diagram of a typical digital spectroscopy configuration.

FIG. 2 is a waveform diagram showing pulse shapes at key points of a typical digital spectrometer.

FIG. 3 is block diagram of a spectroscopy configuration using digital pulse derandomization.

FIG. 7 is a waveform diagram showing the derandomization process.

FIG. 8 is a block diagram of the digital pulse derandomizer.

FIG. 11 is a block diagram of the background pipeline.

BEST MODE FOR CARRYING OUT THE INVENTION

Figure 4:
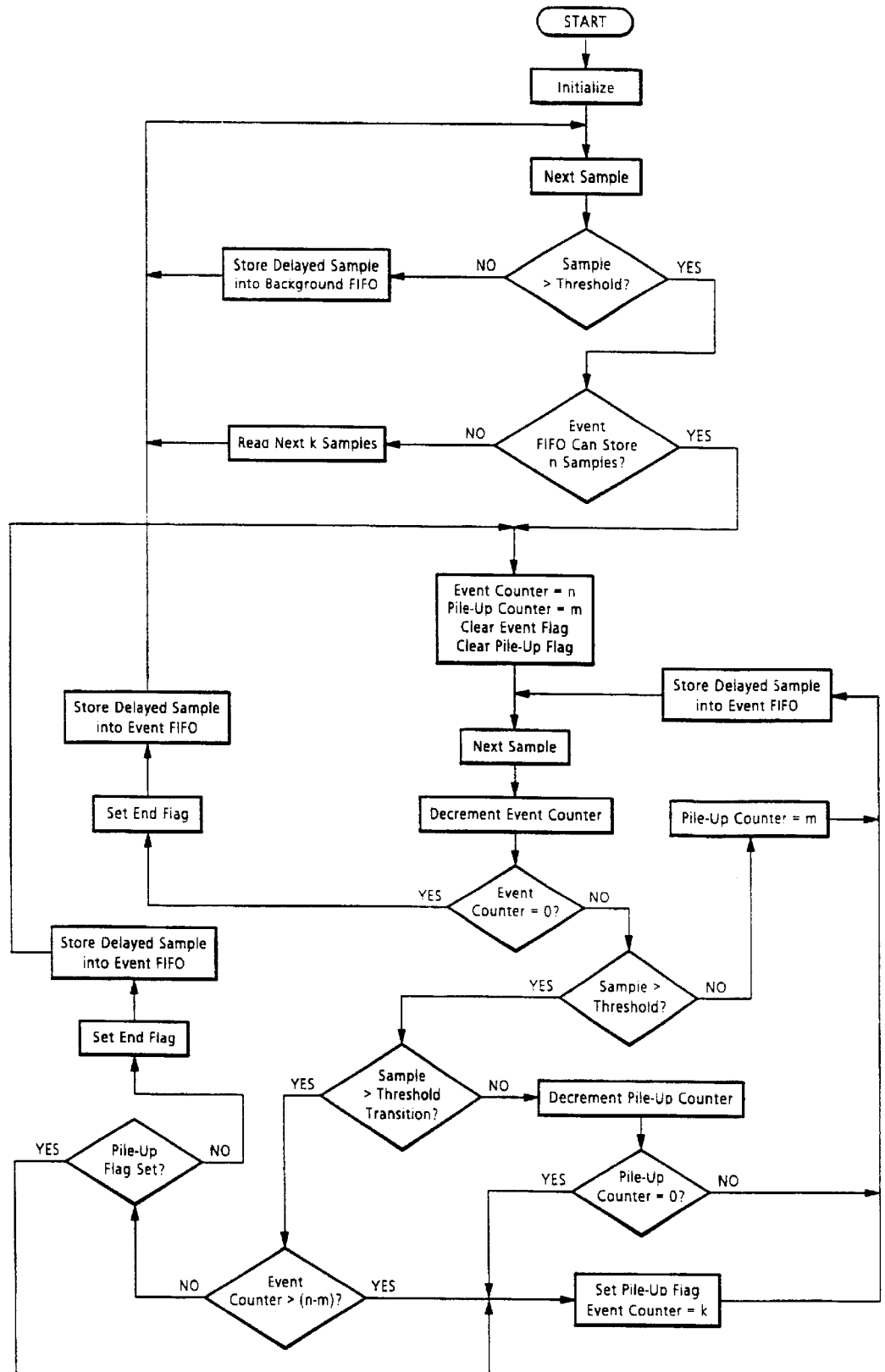
FIG. 4 is a flow diagram showing the separation of event samples from background sample.

A typical radiation spectroscopy configuration is shown in FIG. 1. A charge-sensitive preamplifier senses the signal from the detector. The preamplifier output represents the detector current signal convoluted (folded) with the impulse response of the preamplifier. Linear analog or digital circuits process the signal from the preamplifier in order to achieve the desired pulse shape. The peaks of the shaped pulses are analyzed and a spectrum histogram is built. FIG. 2 illustrates the signal waveforms at various points of the spectroscopy system. The pile-up of the shaped pulses is clearly indicated.

A novel spectroscopy configuration is depicted in FIG. 3. This configuration includes a new block—a digital pulse de-randomizer. The detector signal is pre-processed in a similar way as the traditional system. That is, a preamplifier and/or some differentiation and amplification components are used to condition the signal from the detector. A fast ADC samples the conditioned signal. The discrete signal represents the detector signal folded by the impulse response of the preamplifier and the analog conditioner. Digital techniques exist that can be used to unfold the digitized signal and to restore the detector current pulse. See V. T. Jordanov, G. F. Knoll, A. C. Huber and J. A. Pantazis, "Digital Techniques for Real Time Pulse Shaping in Radiation Measurements", *Nucl. Instr. and Meth.*, A353, pp. 261–264, 1994; and V. T. Jordanov, "Deconvolution of Pulses from a Detector-Amplifier Configuration", *Nucl. Instr. and Meth.*, A351, pp. 592–594, 1994.

It is also possible to synthesize in real time a relatively short pulse with finite duration. See V. T. Jordanov, G. F. Knoll, A. C. Huber and J. A. Pantazis, "Digital Techniques for Real Time Pulse Shaping in Radiation Measurements", *Nucl. Instr. and Meth.*, A353, pp. 261–264, 1994; and V. T. Jordanov and G. F. Knoll, "Digital Synthesis of Pulse Shapes in Real Time for High Resolution Radiation Spectroscopy", *Nucl. Instr. and Meth.*, A345, pp. 337–345, 1994. This short pulse can be generated by fast shaping of the detector current signal or by using a digital delay line clipping technique.

The entire Jordanov references, supra, should be consulted generally for technical background information.

The method for the digital pulse de-randomization is based on the ability to digitally restore the shape of the current signal from the detector and/or to synthesize a short finite duration pulse.

The method to process detector events with derandomization includes the following steps. A charge sensitive preamplifier senses the detector signal. The preamplifier signal is processed with a linear analog signal conditioner with known impulse response. These circuits may include a CR differentiation stage, an amplification stage and additional RC filtering sections. The signal at the output of the analog conditioner is digitized using a fast ADC. The digitized signal is passed to a digital unfolding/fast-shaping unit that unfolds the combined response of the preamplifier and the analog conditioner and/or produces a fast pulse with finite duration. The unfolding/fast-shaping unit generates a discrete short pulse superimposed on a digitized noise background.

This method also utilizes the fact that the random noise background samples are not correlated (or correlated in time interval that is much shorter than the total pulse processing time). This allows pieces of background samples to be borrowed from time intervals between successive events that are outside the signal region. A low-level discriminator is used for event recognition and separation of the signal samples from the noise background samples. The background samples are separated from the signal samples and stored in one or more background FIFO (first-in-first-out) pipelines.

The digital samples corresponding to an event pulse are stored in an event FIFO pipeline. The length (number of samples) that represents a single event must be equal or longer than the duration of the detector current signal but no longer than a predetermined time limit. The pulse processing time of the digital shaper plus some number of samples account for timing uncertainties and finite charge collection time. A pile-up rejection circuit is used to discriminate against very close events. Two flags are stored along with each sample in the event pipeline. The first flag is the pile-up flag which when set marks the current event as a pile-up event. The second flag is the end (start) flag. This flag is set only when the last (first) sample of a given event record is stored. Using the end (start) flag, a separation of the successive event records can be made when the output of the pipeline is read.

This method involves recognition of the arrival of an event pulse from the digitized sequence of the detector signal. This recognition can be done using a threshold that is set slightly above the noise level of the noise background. In cases when this threshold is too high, an additional shaping of the fast pulse can be done. In this case, the threshold is set slightly above the noise level of the shaped signal. The shaped pulses are used for event recognition. Due to time uncertainties and delays, it is necessary to mark as an event a digitized signal piece that is longer than the maximum possible duration of the fast pulse. This is achieved by using a pre-triggering technique—that is the unfolded digital signal (fast pulse) passes through a constant delay, while the event recognition signal does not. The constant delay time (number of samples) is equal to or greater than the maximum expected delay between the moment of detector interaction and the time of event recognition. The event recognition signal initiates separation of the delayed event samples. The separation of the event samples continues for a time period that is at least equal to or longer than the maximum expected duration of the fast pulse plus the pre-trigger delay time.

The separated event samples and the noise background samples are read at the output of the corresponding pipelines. The pipelines have sufficient depth for effective reduction of statistical fluctuations of the time intervals between successive events. Each event record (all samples corresponding to a single event) is read. Each event record includes the digitized detector current signal and some or no noise background samples. If the length of the event record is equal to the pulse processing time plus the pre-trigger time, the event samples are passed to the digital pulse shaper and next event record, if available, is read. If no event record is available the background pipeline is read and passed to the digital pulse shaper. If the length of the event record is shorter than the pulse processing time then background samples are added to the event record. The background samples are read until the desired length of the event record (event plus noise background) becomes equal to the pulse processing time plus the pre-trigger time. This combined event and background record is passed sequentially to the digital pulse shaper. In some cases, such as scintillation detectors, it might be advantageous to add to the event record a digital value that represents the average over certain time of the background samples. In such a case an averager can be substituted for the background pipeline. The entire process of reading event and background records is continuous, producing a continuous de-randomized detector event sequence.

The samples from the background pipeline can be used to estimate the baseline of the signal. These samples can be passed to a baseline estimator that will produce a correction signal to stabilize the main pulse shaper that follows the de-randomizer. The correction signal can also be used for noise level estimation.

The procedure described above can achieve de-randomization of the events with an average interval between adjacent events equal to or longer than the pulse processing time. In this case, the ADC sampling frequency, the FIFO pipeline recording frequency and the FIFO pipeline read frequency are equal. If the average time interval between adjacent events is shorter than the pulse processing time, then a modification of this method can be used. In this case the ADC and the FIFO pipeline writing frequencies are equal. The pipeline reading frequency can be higher than the ADC sampling frequency. This difference in the writing and reading frequencies requires that more samples be available for processing. Having more than one background pipeline allows reuse of some of the background samples. In this case, the background samples are stored simultaneously in two FIFO pipelines. One of the pipelines is primary and the other is secondary. If the secondary pipeline becomes fill an overwriting of the oldest sample in the pipeline occurs. If during the derandomization process the primary noise background pipeline becomes empty, then background samples are borrowed from the other pipelines. When a sample is read from the secondary FIFO pipeline, the sample is not removed from the pipeline. However, the position of the sample in the FIFO queue changes from first to last in the FIFO queue. This happens only if there is not a simultaneous storage of background samples into the secondary pipeline. If there is a simultaneous store operation, the first sample (just read) is taken out of the queue. The stored sample take the last position in the FIFO queue.

For proper operation of the spectrometer, it is necessary that the digital pulse shaper operate at the same frequency as the pipeline reading frequency. This allows implementation of the same pulse shaping function (as in a case of equal writing and reading frequencies) but in an accelerated time scale. As a result, more de-randomized events will be processed per unit of real time at higher event rates.

In some radiation measurements, the event rate varies in time. In such cases, the reading frequency can be adjusted depending on the event rate. Such adaptive clock configurations require the FIFO pipeline reading clock (also digital shaper clock) to operate at two frequencies—the ADC sampling frequency and a frequency that is higher than the ADC clock frequency. It is also necessary to synchronously switch between these two frequencies. In this case, any time the event FIFO becomes empty the reading clock switches to the lower ADC clock frequency. If there is a sample(s) waiting in the event FIFO pipeline, the reading clock switches to the higher frequency. As a result the average reading frequency for low event rates (less than 1/pulse processing time) will be equal to the ADC sampling frequency. For higher event rates, the average reading frequency will adjust so that the maximum possible derandomization can be achieved. When operating at reading frequencies higher than the ADC sampling frequency, the recycling configuration with two FIFO pipelines must be used.

The flow diagram in FIG. 4 illustrates the process that separates and stores event and background samples. The input (digital samples) to the diagram is the digitized unfolded detector current signal. The threshold functions in the diagram can also be performed using a slightly shaped (rectangular or triangular) detector current signal. The procedure starts with initialization that puts all the components in their initial state. It is important to note that there is delay between the samples that are stored and the samples that are used for event recognition. The delayed samples are the one that are stored in the pipelines. After the initialization, a sample is read. If the sample is below the noise threshold, the delayed sample is stored as a background sample. This continues until the threshold is exceeded. An additional sample is stored in the background pipeline. Then the flags are cleared and two counters are initialized. The event counter is loaded with the maximum number of samples n allowed for a single event record. The pile-up counter is loaded with the maximum number of samples m that represent the maximum duration of a detectable pile-up free current pulse. Note that the difference between n and m determines the pile-up sensitivity. If m is equal to or greater than n, no pile-up events will be tagged. Further, the flow follows the method described in the previous sections.

Figure 5:
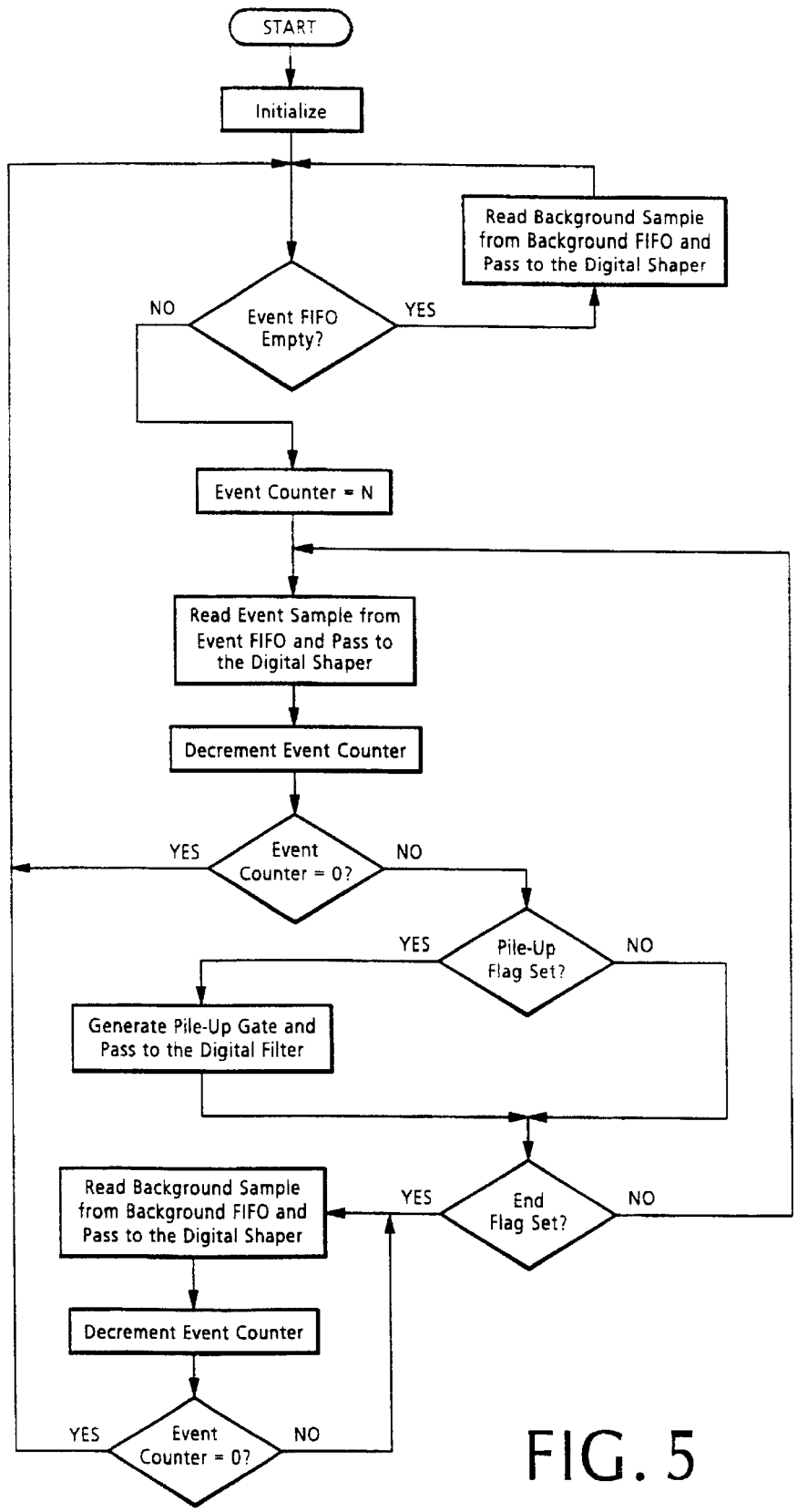
FIG. 5 is a flow diagram of the process that separates and stores event and background samples.
Figure 6:
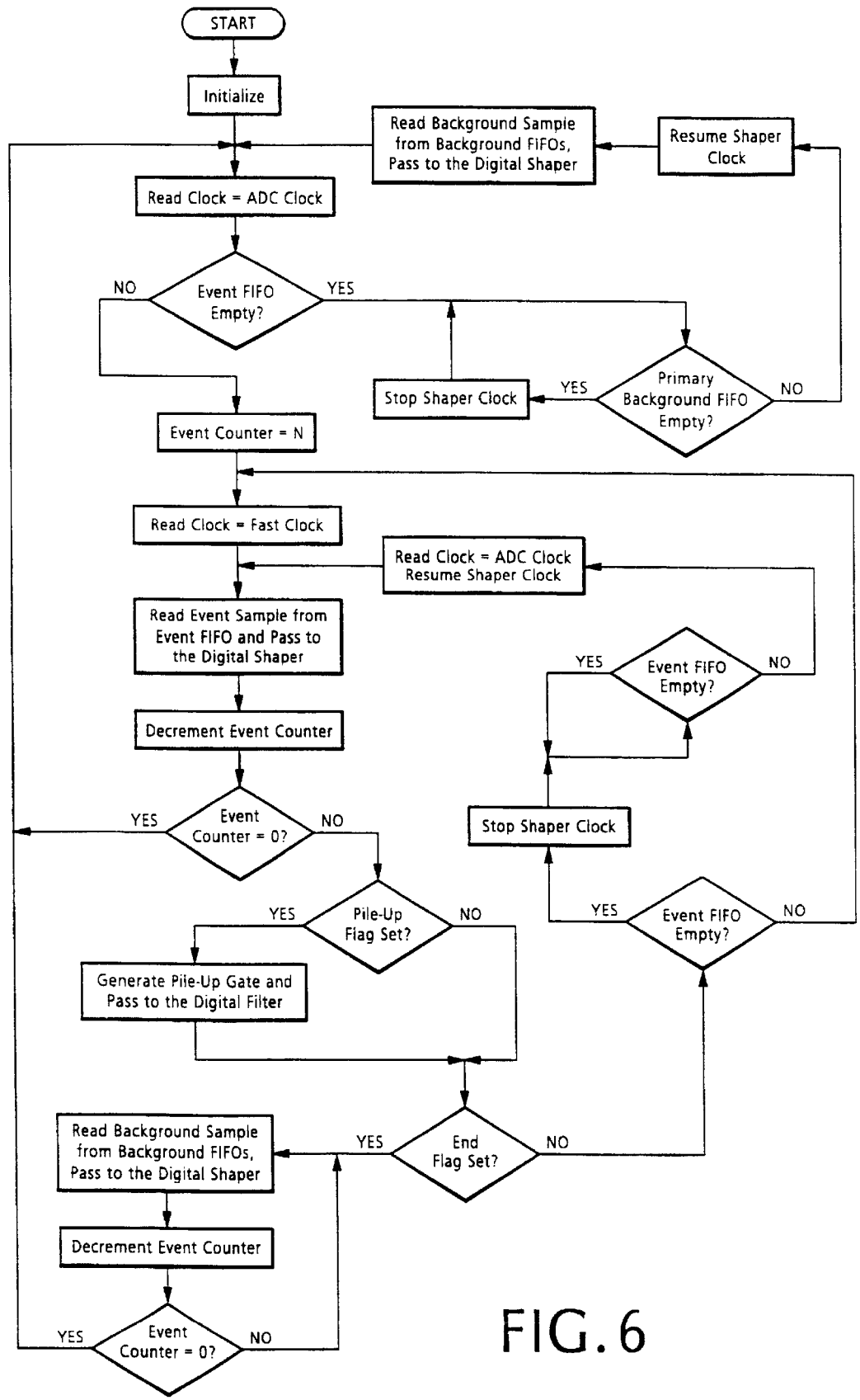
FIG. 6 is a flow diagram of the pipeline reading process using an adaptive reading clock.

Two flow diagrams show the read procedures: FIG. 5 is for the case when the reading frequency is equal to the sampling frequency of the ADC. FIG. 6 represents the case with an adaptive clock, when the reading frequency adjusts depending on the detector event rate. The sample counter is pre-loaded with the number of samples N necessary for normal processing of the detector events. In all of the diagrams, the background samples are stored in one or two pipelines—the process of reading or storing implies either one of or both primary and secondary background pipelines. FIG. 7 illustrates the process of separation when stored and combination when read of the event and noise background samples.

The block diagram of the pulse derandomizer is shown in FIG. 8. The sampled signal is processed by a circuit (1) that unfolds the response of the analog circuits preceding the ADC. Following the circuit is a finite response fast pre-filter (2). If the noise of the system is small than the fast filter is a simple transmitter of the signal from the unfolding unit (1). The output of the fast pre-filter (2) is applied to a delay pre-trigger pipeline (3) and to the unit that separates events from background samples—event separator (4). The event separator produces the necessary signals to control write operations to the event pipeline (5) and the background pipeline (6). The event separator also produces a pile-up signal and a tagging mark that indicates the end of each event record. The sampled data from the output of the pre-trigger delay pipeline are stored either in the event pipeline or in the background pipeline. The process of reading the event and the data pipelines is controlled by the data combine unit (7). Using various control signals the data combine unit reads sequentially event records and/or background samples and passes them to the main shaping unit through the data multiplexer (8). Two separate clocks that might be connected together drive the pipeline write and read sides.

Figure 9:
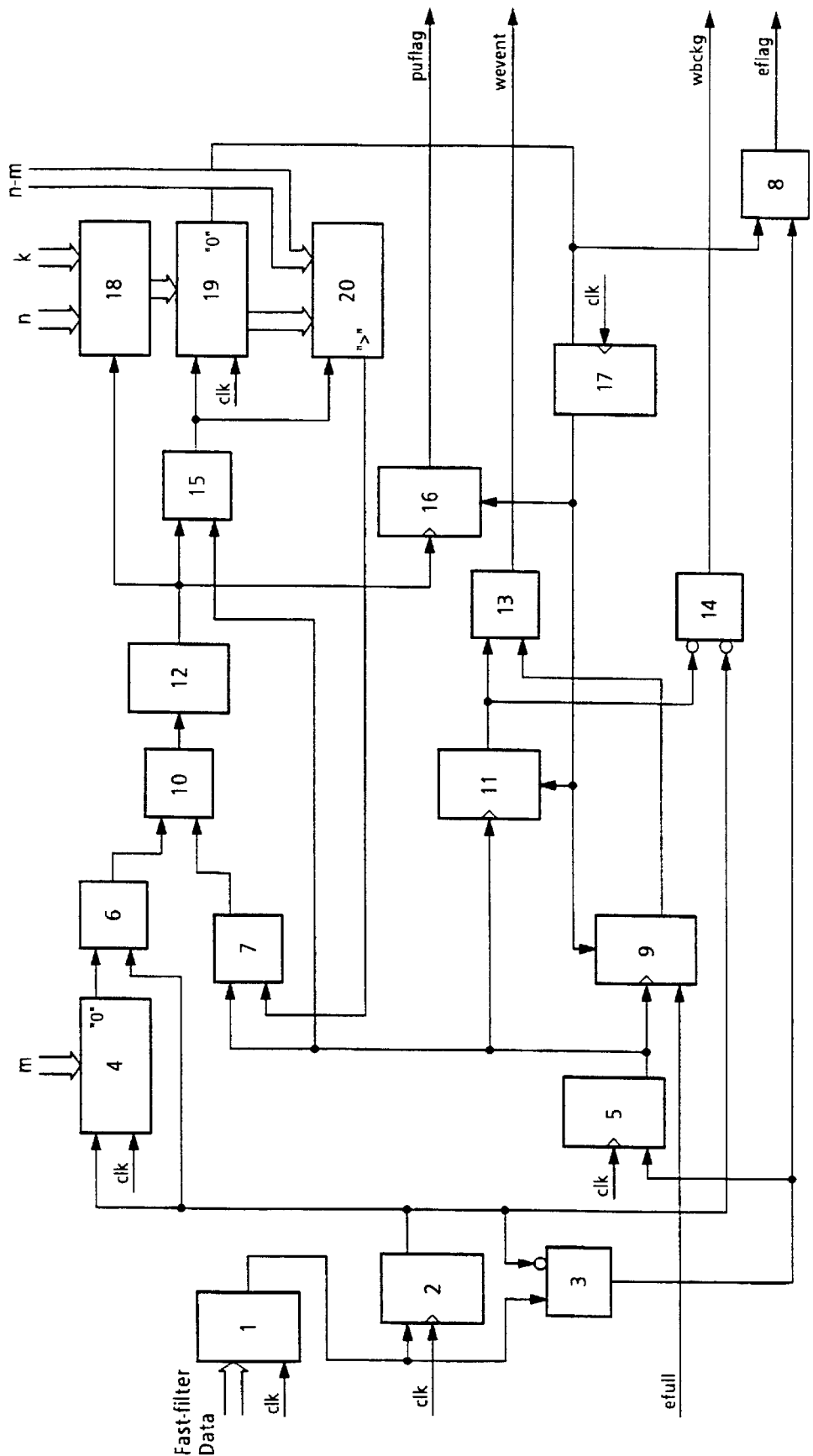
FIG. 9 is a block diagram of the event separator.

A block-diagram of the event separator is shown in FIG. 9. The discrete signal from the fast pre-filter is applied to a low-level discriminator LLD (1). The D type flip-flop DFF (2) follows the signal changes at the output of the LLD. A one clock period signal is generated through the AND gate (3). This signal is used to mark the end (or the beginning) of an event record. It also passes through a D type flip-flop DFF (5). When the output of the DFF (2) is low a constant is asynchronously loaded into the down counter (4). The constant m is the maximum allowed duration of the pulses at the output of the LLD (1). If the duration of a signal at the output of the LLD (DFF (2), respectively) is longer than m, than a pile-up condition occurs. Through the AND gate (6) and the OR gate (10) an one-shot circuit is triggered. The pulse at the output of the one-shot (12) sets the DFF (16) that activates the pile-up flag (puflag). The one shot (12) also causes through the OR gate 15 an asynchronous load of a constant k into the down counter (19). The constant k represents the minimum samples to be recorded per single detected event. The down counter (19) can be also loaded with a constant n that is the maximum number of samples to be stored per event. The selection of n or k is done by a multiplexer (18).

The data output of the down counter (19) is compared to a constant (n-m) that represents the minimum separation between two events to be considered non pile-up. The comparator (20) is active when the down counter value is greater than (n-m). If during this time a pulse is detected at the output of DFF (5) the one-shot (12) is triggered through the AND gate (7) and the OR gate (10) The constant n is loaded into the down counter (19) at the beginning of each event record.

The DFF (11) controls the write signals (event) and (wbckg) of the event and background pipelines respectively. The control is done through an AND gates (13) and (14). Writing to the background pipeline is always prohibited when the output of the DFF(2) is high. The DFF (9) is used to disable the writing to the event pipeline when there is not enough room to store the maximum possible number of samples per event. At the end of one or few sequential event records the separator circuit is placed in initial state by the equal zero output of the down counter (19) and the DFF (17).

Figure 10:
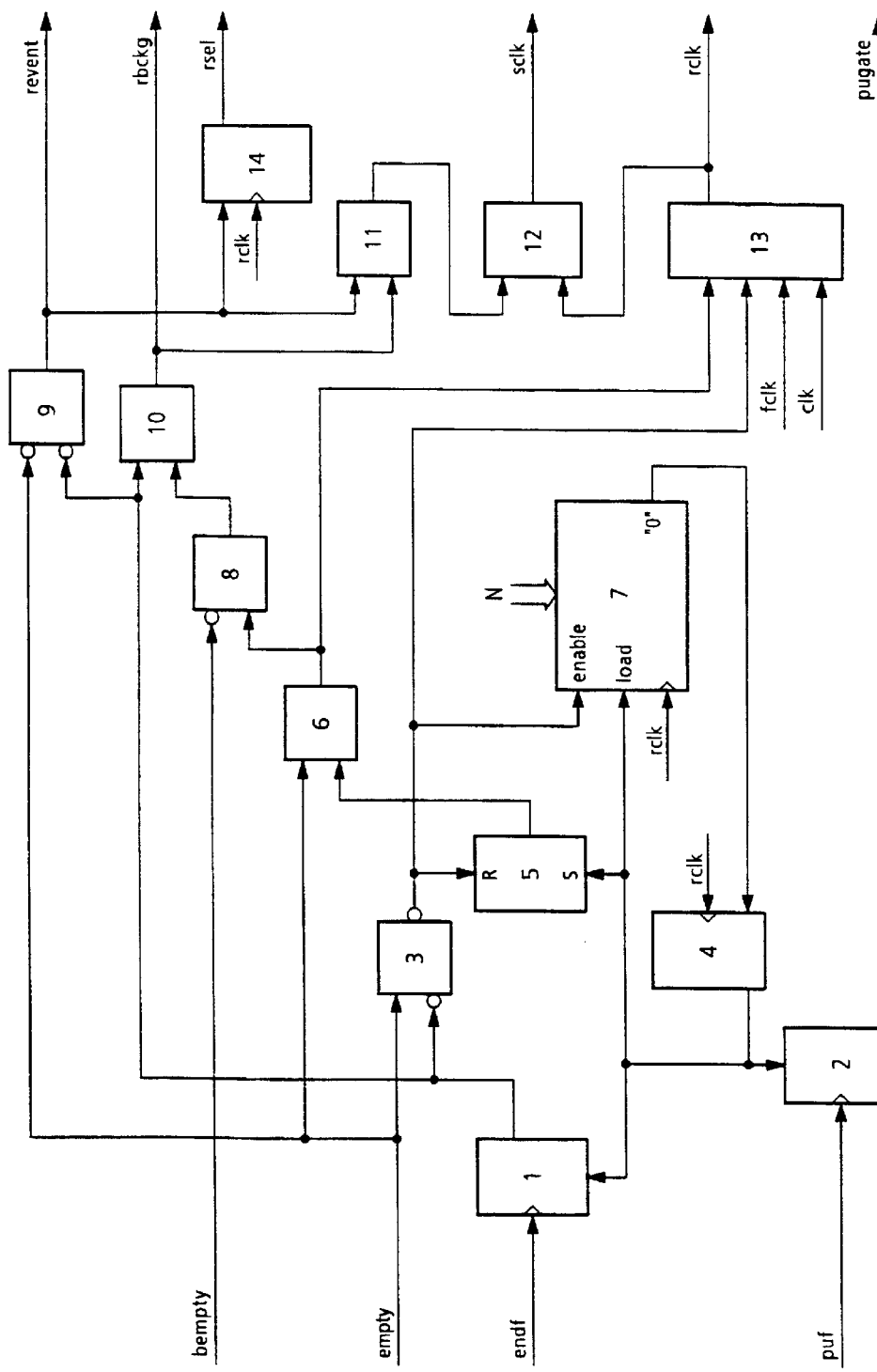
FIG. 10 is a block diagram of the data combine unit.

FIG. 10 shows the block diagram of the data combine unit. The event pipeline empty flag (empty) is connected to a NAND gate (3). The end event line (endf) from the event pipeline is connected to a DFF (1) . The read event enable signal (revent) and the read background enable signal (rbckg) are activated through a combinatorial logic that comprises the AND gates (6) (8) and (9) and the OR gate (10). The adaptive clock function is controlled by the clock selector (13).

The block diagram of the circuit of the background pipeline is shown in FIG. 11. The circuit includes the data multiplexers (1), (6) and (7), two FIFO pipelines (4) and (5)—primary and secondary respectively, OR gate (2) and data latch (3). When the primary pipeline is empty the read signal from the data combine unit is routed through the multiplexer (6) to the secondary pipeline. The output data lines of the secondary pipeline are selected through the multiplexer (7). Every time the secondary pipeline is read the read value is written back to the pipeline if there is not a simultaneous write operation from the event separator. The write back function is accomplished via the latch (3) and the OR gate (2).

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like when used herein refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A method of digitally de-randomizing pulses in a radiation spectroscopy system, said method comprising the steps of:
   (a) receiving an input signal representative of a radiation detector output;
   (b) analyzing said input signal to derive separate event samples and background samples;
   (c) storing said event samples and said background samples; and
   (d) reading stored said event samples and said background samples and adjusting spacing in time between adjacent said event samples such that said event samples are spaced apart a time interval at least equal to pulse processing time of elements receiving an output of spaced apart said event samples and said background samples.

2. An apparatus for digitally de-randomizing pulses in a radiation spectroscopy system, said apparatus comprising:
   (a) means to receive an input signal representative of a radiation detector output;
   (b) means to analyze said input signal to derive separate event samples and background samples;
   (c) means to store said event samples and said background samples; and
   (d) means to read stored said event samples and said background samples and to adjust spacing in time between adjacent said event samples such that said event samples are spaced apart a time interval at least equal to pulse processing time of elements receiving an output of spaced apart said event samples and said background samples.

* * * * *